(12) United States Patent
Demsey et al.

(10) Patent No.: US 10,950,250 B2
(45) Date of Patent: *Mar. 16, 2021

(54) SYSTEMS AND METHODS FOR DETECTING AND REMOVING TRACEABLE IDENTIFYING AUDIO CONTENT FROM MEDIA CONTENT

(71) Applicant: Verizon Media Inc., Dulles, VA (US)

(72) Inventors: Seth Mitchell Demsey, Dulles, VA (US); Jay Crystal, Arlington, VA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,782

(22) Filed: Mar. 31, 2020

(65) Prior Publication Data

US 2020/0227055 A1   Jul. 16, 2020

Related U.S. Application Data

(63) Continuation of application No. 15/926,763, filed on Mar. 20, 2018, now Pat. No. 10,643,627, which is a
(Continued)

(51) Int. Cl.
| | |
|---|---|
| *G10L 19/018* | (2013.01) |
| *H04N 21/233* | (2011.01) |
| *H04N 21/81* | (2011.01) |
| *G10L 19/02* | (2013.01) |
| *H04N 21/27* | (2011.01) |

(Continued)

(52) U.S. Cl.
CPC ........ *G10L 19/018* (2013.01); *G10L 19/0212* (2013.01); *G10L 21/00* (2013.01); *H04N 21/233* (2013.01); *H04N 21/27* (2013.01); *H04N 21/274* (2013.01); *H04N 21/278* (2013.01); *H04N 21/812* (2013.01); *G10L 25/48* (2013.01);
(Continued)

(58) Field of Classification Search
None
See application file for complete search history.

(56) References Cited

U.S. PATENT DOCUMENTS

| | | | | |
|---|---|---|---|---|
| 9,953,657 B1 * | 4/2018 | Demsey | ............... | H04N 21/233 |
| 10,643,627 B2 * | 5/2020 | Demsey | ............... | H04N 21/278 |

(Continued)

*Primary Examiner* — Mulugeta Mengesha
*Assistant Examiner* — Charles N Hicks
(74) *Attorney, Agent, or Firm* — Bookoff McAndrews, PLLC

(57) ABSTRACT

Systems and methods are disclosed for detecting and removing traceable identifying audio content from electronic media content. One method includes: receiving, over a network, media content to be broadcast or distributed, the media content including audio data; determining whether the audio data of the media content includes traceable identifying audio content defined by an audio identifier; generating new audio data based on the audio data of the media content when an audio identifier is determined to be include in the audio data; removing audio data from the media content when the audio identifier is determined to be include in the audio data; adding the new audio data to the media content when the audio data is removed from the media content; and broadcasting or distributing the media content having the new audio data to one or more user devices.

18 Claims, 5 Drawing Sheets

Related U.S. Application Data continuation of application No. 15/205,379, filed on Jul. 8, 2016, now Pat. No. 9,953,657.

(51) Int. Cl.
| | |
|---|---|
| *H04N 21/278* | (2011.01) |
| *H04N 21/274* | (2011.01) |
| *G10L 21/00* | (2013.01) |
| G10L 25/48 | (2013.01) |
| H04N 21/4722 | (2011.01) |
| H04N 21/442 | (2011.01) |
| H04N 21/422 | (2011.01) |

(52) U.S. Cl.
CPC . *H04N 21/42203* (2013.01); *H04N 21/44222* (2013.01); *H04N 21/4722* (2013.01)

(56) References Cited

U.S. PATENT DOCUMENTS

| | | |
|---|---|---|
| 2009/0144325 A1 | 6/2009 | Chastagnol et al. |
| 2015/0194159 A1 | 7/2015 | Mai |
| 2016/0197938 A1 | 7/2016 | Van Overbruggen |
| 2016/0379234 A1 | 12/2016 | Shah et al. |

* cited by examiner

SYSTEMS AND METHODS FOR DETECTING AND REMOVING TRACEABLE IDENTIFYING AUDIO CONTENT FROM MEDIA CONTENT

CROSS-REFERENCE TO RELATED APPLICATIONS

This application is a continuation of and claims the benefit of priority to U.S. application Ser. No. 15/926,763, filed Mar. 20, 2018, which is a continuation of and claims the benefit of priority to pending U.S. Nonprovisional patent application Ser. No. 15/205,379, filed on Jul. 8, 2016, now U.S. Pat. No. 9,953,657, issued Apr. 24, 2018, each of which is incorporated by reference herein in its entirety.

TECHNICAL FIELD

The present disclosure relates to improving user privacy and protecting user interests while distributing media content over an electronic network and, more particularly, to detecting and removing traceable identifying audio content from electronic media content before distribution over an electronic network.

BACKGROUND

Content providers and/or advertisers often attempt to track the efficiency and exposure of their content/advertisements across a plurality of different electronic mediums, such as TV, Internet, mobile devices, and radio. Cookies, IP addresses, tracking pixels, set-top box identifiers, and other methods are often used to enable tracking of the content's/advertisement's performance across its interaction with a user over multiple devices, including through "conversion" (i.e., a click, purchase, sign-up, etc.). Still, tracking content/advertisement performance between various mediums like TV, Internet, mobile devices, and radio has been difficult. As a result, certain content providers and advertisers have attempted to begin the practice of installing and running software applications on user devices that enable the tracking and monitoring of a user's exposure to the content/advertisement based on audio received by a microphone of a user device.

The gathering and collecting of data through the use of a microphone of a user device has raised privacy concerns and criticism about collecting and using certain types of data without the user's knowledge. Many users are understandably unaware that personal data is being collected from their device and sold to third parties, or at least used to track the content/advertisement performance. Some people find such user tracking and profiling methods employed by advertisers to be intrusive or invasive, but find "opting-out" to be difficult or unavailable.

Monetizing data regarding electronic content/advertisement performance is important for the ability to provide online content that is inexpensive from the user's standpoint. However, privacy concerns must be taken seriously and addressed to maintain user loyalty and to protect the long-term interests of content providers, advertisers, publishers, ad networks, and of course, the users themselves.

Thus, embodiments of the current disclosure relate to improving user privacy and protecting user interests while distributing media content over an electronic network and, more particularly, to detecting and removing traceable identifying audio content from electronic media content before distribution over an electronic network.

SUMMARY OF THE DISCLOSURE

Embodiments of the present disclosure include systems, methods, and computer-readable media for detecting and removing traceable identifying audio content (also referred to as "audio identifiers") from electronic media content.

According to embodiments of the present disclosure, computer-implemented methods are disclosed for detecting and removing traceable identifying audio content from electronic media content. One method includes: receiving, over a network at one or more servers, media content to be broadcast or distributed, the media content including audio data; determining, by the one or more servers, whether the audio data of the media content includes traceable identifying audio content defined by an audio identifier; generating, by the one or more servers, new audio data based on the audio data of the media content when an audio identifier is determined to be included in the audio data; removing, by the one or more servers, audio data from the media content when the audio identifier is determined to be included in the audio data; adding, by the one or more servers, the new audio data to the media content when the audio data is removed from the media content; and broadcasting or distributing, by the one or more servers, the media content having the new audio data to one or more user devices.

According to embodiments of the present disclosure, systems are disclosed for detecting and removing traceable identifying audio content from electronic media content. One system includes a data storage device that stores instructions system for detecting and removing traceable identifying audio content from electronic media content; and a processor configured to execute the instructions to perform a method including: receiving, over a network, media content to be broadcast or distributed, the media content including audio data; determining whether the audio data of the media content includes traceable identifying audio content defined by an audio identifier; generating new audio data based on the audio data of the media content when an audio identifier is determined to be include in the audio data; removing audio data from the media content when the audio identifier is determined to be include in the audio data; adding the new audio data to the media content when the audio data is removed from the media content; and broadcasting or distributing the media content having the new audio data to one or more user devices.

According to embodiments of the present disclosure, non-transitory computer-readable media storing instructions that, when executed by a computer, cause the computer to perform a method for detecting and removing traceable identifying audio content from electronic media content are also disclosed. One method of the non-transitory computer-readable medium including: receiving, over a network, media content to be broadcast or distributed, the media content including audio data; determining whether the audio data of the media content includes traceable identifying audio content defined by an audio identifier; generating new audio data based on the audio data of the media content when an audio identifier is determined to be include in the audio data; removing audio data from the media content when the audio identifier is determined to be include in the audio data; adding the new audio data to the media content when the audio data is removed from the media content; and broadcasting or distributing the media content having the new audio data to one or more user devices.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Figure 1:
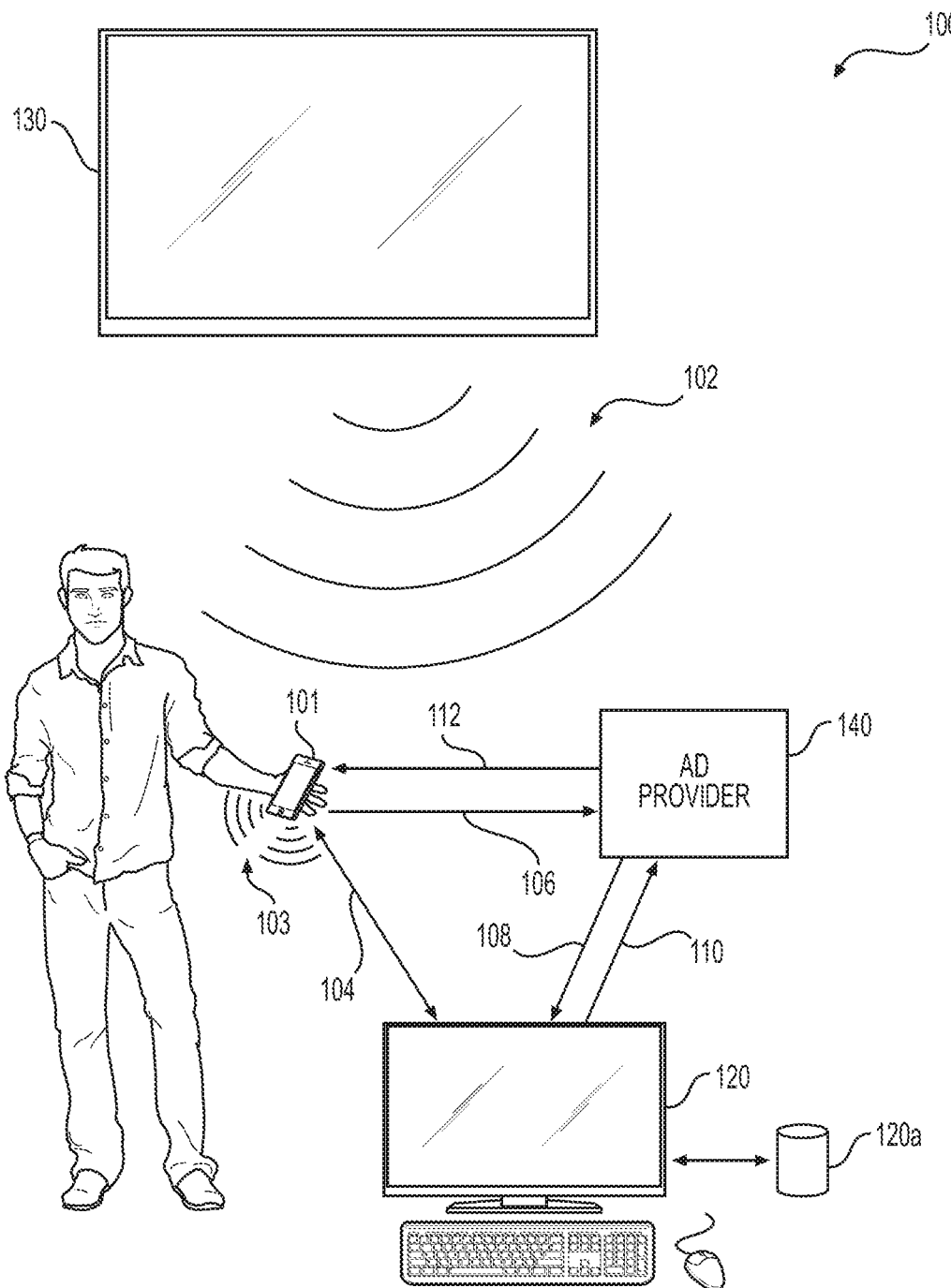
FIG. 1 depicts a schematic diagram of a network and device environment of a method for detecting and removing traceable identifying audio content from electronic media content, according to embodiments of the present disclosure.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION OF EMBODIMENTS

As described above, certain advertising agencies and companies have begun the practice of inserting identifying audio content, e.g., audio "fingerprints" or audio "breadcrumbs" within multimedia content that they provide to publishers and ad networks for distribution over an electronic network (e.g., the Internet). In some cases, a publisher and/or ad network may desire to remove the identifying audio content from the media content before distributing the media content to users, for the purpose of protecting user interests, e.g., privacy and other interests. Thus, the present disclosure is directed to techniques for detecting and removing traceable identifying audio content, e.g., defined by one or more audio identifiers, from electronic media content. As described in more detail below, in certain embodiments, the audio identifiers may be determined to be present in the audio data based on the presence of frequencies inaudible to a human ear, such that when the audio data is reproduced by an electronic device, e.g., audio speaker, the sound of the audience-directed audio data is not interfered with by the presence of the audio identifier.

In an embodiment of the present disclosure, detecting and removing traceable identifying audio content from electronic media content may comprise first determining whether a given media content item includes traceable identifying audio content having audio identifiers. The media content may be of an audio format, such as streaming audio, music, radio, and the like, and/or audio-video format, such as an online video, a television program, a video advertisement, and the like. The audio data may include an audio identifier, also referred to as an audio beacon, added to the media content that is used to identify and monitor a user across a plurality of user devices. When an audio identifier is added to the media content, the audio identifier may be all or part of the audio data and/or mixed with audio data of the media content to be broadcast. The audio identifier may be used by an advertiser affiliated with the media content to identify a user that was exposed to the media content. The media content may be one or more of a television show, a radio program, a video advertisement, a radio advertisement, streaming multimedia, and/or any other media file having audio data. The media content may be broadcast or distributed by one or more of satellite, direct to home, Internet, IP, cinema, and radio. Further, the media content may also be broadcast or otherwise distributed via a stored medium, such as CD, DVD, Blu-ray, flash storage, and the like. The media content may be broadcast on one or more electronic devices. Examples of the one or more electronic devices include television, radio, computer, laptop, mobile phone, PDA and the like.

The audio identifier may have been included in the media content by mixing the traceable identifying audio content, e.g., audio identifier, with existing audio in the media content and/or by adding an additional audio layer to the media content. Thus, the audio data may include the audio identifier so as to be able to identify the media content. In one embodiment, the audio identifier may be a set of audio frequencies. The audio frequencies may be in one or both of an ultrasonic range and/or an infrasonic range. The audio identifier in the one or both of the ultrasonic range and/or infrasonic range may be a frequency range inaudible to humans. Infrasonic ranges may be an audio frequency range that is lower than about 20 Hz+/−15%. Ultrasonic ranges may be an audio frequency range that is of about 17 kHz+/−15% and above.

In an alternative embodiment, the audio identifier may be all or part of the audio data of the media content that is transformed using a mathematical algorithm, such as an integral transform. The integral transform used to transform the audio data into the audio identifier may include one or more of a Fourier transform, Fourier sine transform, Fourier cosine transform, Hartley transform, Mellin transform, two-sided Laplace transform, Laplace transform, Weierstrass transform, Hankel transform, Abel transform, Hilbert transform, Poisson kernel, and/or an identity transform.

When the media content is broadcast or distributed, the audio data may then be received on at least one user device to be identified and targeted. The at least one user device may receive the audio data by extracting the audio data from the media content. Examples of the user device include, but are not limited to, mobile phones, tablets, and computers. The audio data may be received by an application installed and running on the user device, by accessing a microphone connected to the user device. The application may be running in the foreground or in the background of the user device.

The audio identifier of the audio data may then be associated with the at least one user device. In one embodiment, the audio identifier may be combined with other data, such as a timestamp of when the media content was received, when the media content was scheduled to be broadcast or displayed, to whom the media content was distributed, and so on. Thereby, the audio identifier in the audio data may be associated with a user of the at least one user device being exposed to the media content having the audio data. For example, in one embodiment, the media content may be a television advertisement about a given product. The television advertisement may include an audio identifier in the audio data of the television advertisement. A user device having a microphone may receive the audio data of the television advertisement, and may determine whether the audio data includes an audio identifier. If the audio data includes the audio identifier, then the user device may then identify that the user of the user device was exposed to the television advertisement, and associate an identifier of the user with an identifier of the television advertisement.

After associating the audio identifier with the at least one user and/or user device, the association may be transmitted to a system for identifying and monitoring activity and advertising to user devices. The system for identifying and monitoring user devices may then transmit one or more of advertisements, notifications, messages, and/or applications based on the association of the user device with the identifier. Upon receiving the one or more advertisements, notifications, messages, and/or applications at the user device, the advertisements, notifications, messages, and/or applications may be displayed, installed, and/or run on the user device. The one or more of advertisements, notifications, messages, and/or applications may relate to the media content including the audio identifier.

Specific embodiments of the present disclosure will now be described with reference to the drawings. FIG. 1 depicts a schematic diagram of a network environment for a method of identifying, monitoring, and removing identifying audio data distributed to user devices, according to embodiments of the present disclosure. The method may begin at step 102, in which a user device, such as mobile device 101, receives audio data from a media content item, such as a television commercial, broadcast on a television 130. In an alternative embodiment, the user device may receive audio data, such as audio data 103 from mobile device 101, of a media content item from one or more of a movie, a computer, the user device, another user device, a mobile phone, and/or any device capable of transmitting audio data. The audio data may be received at a microphone connected to the user device, and the audio data may be processed by an application executing on the user device. In one embodiment, the application may be executing in the background of an operating system running on the user device. Alternatively, the application may be executing in the foreground of an operating system running on the user device.

The audio data processed by the application may include an audio identifier. The audio identifier may be a unique identifier of the media content item. The application on the user device may be configured to determine whether an audio identifier is included within the audio data. If the application determines that an audio identifier is included in the audio data, then the application may translate the audio identifier from the audio data into a unique media identifier that identifies the distributed media content.

At step 104, the application may then transmit one or both of the unique media identifier and a unique device identifier that identifies the user device that received the audio data, to an identifying and monitoring server 120. Examples of the unique device identifier include, but are not limited to, a device identity number, an International Mobile Station Equipment Identity (IMEI) number, an operating system identifier, a service identifier, a unique advertising identifier, a Unique Device Identifier (UDID), a mobile phone number, and/or a Media Access Control (MAC) address.

In one embodiment, the unique media identifier and the unique device identifier may be transmitted over a network, such as the Internet. In an alternative embodiment, the unique media identifier and unique device identifier may be transmitted by a text message from the user device via a short message service (SMS) and/or a multimedia messaging service (MMS). The identifying and monitoring server 120 may store the unique device identifier in association with the unique media identifier in an identifying and monitoring database 120*a*.

After transmitting the unique device identifier and unique media identifier, the user device may transmit a request for an advertisement. The request for an advertisement may be transmitted to an advertisement provider 140, such as an ad server, an ad exchange, and/or the identifying and monitoring server 120, at step 106. In one embodiment, an ad exchange may transmit a request for bids to a plurality of ad servers and/or the identifying and monitoring server at step 108. The identifying and monitoring server 120 may receive the request for bid, and may determine whether a unique device identifier of the bid request matches the unique device identifier stored in the identifying and monitoring database 120*a*. When the unique device identifier of the bid request matches the unique device identifier stored in the identifying and monitoring database 120*a*, the identifying and monitoring server 120 may determine a response to the bid request, including an advertisement, based on one or more unique media identifiers stored in association with the unique device identifier. The identifying and monitoring server 120 may then transmit the response to the bid request to the ad exchange (ad provider 140) at step 110. At step 112, the ad exchange may transmit the advertisement included with the response to the bid request from the identifying and monitoring server 120. At step 114, the advertisement from the identifying and monitoring server 120 may be displayed on the user device, such as mobile device 101.

In some cases, the media content provider may desire to detect and/or remove audio identifiers from the media content before the media content provider transmits and/or broadcasts the media content. A benefit of detecting and/or removing audio identifiers in the media content is that it allows a media content provider to ensure the integrity of the media content that is being broadcast or distributed. In another embodiment, a user may desire to detect and/or remove audio identifiers from being received and/or used for tracking purposes on a user device. A benefit of detecting and/or removing audio identifiers on a user device is that it allows a user to maintain his or her privacy.

Figure 2:
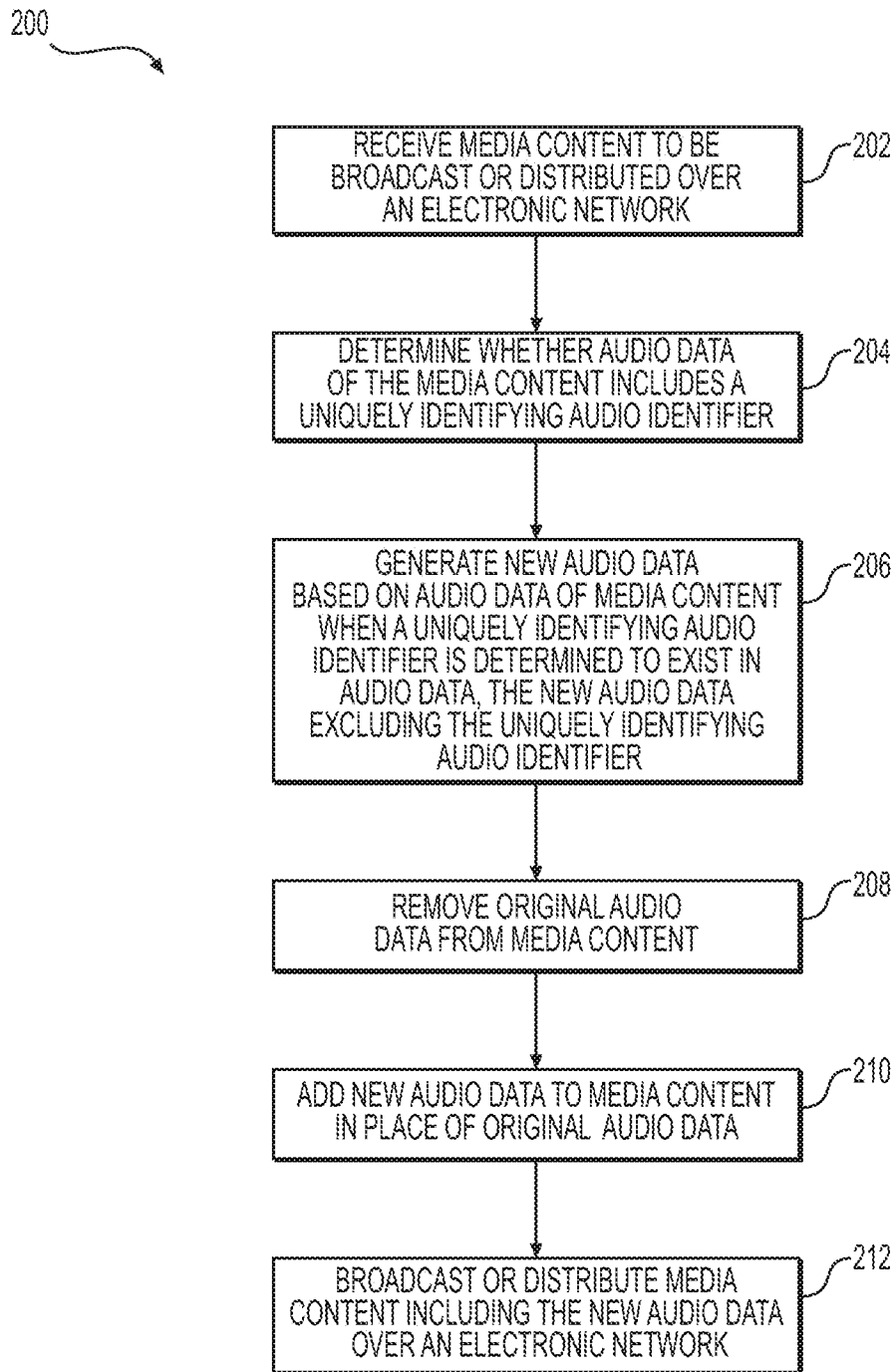
FIG. 2 depicts a block diagram of a method for detecting and removing traceable identifying audio content from electronic media content, according to embodiments of the present disclosure.

FIG. 2 depicts a block diagram of a method for detecting and removing traceable identifying audio content from electronic media content, according to embodiments of the present disclosure. The method 200 may begin at step 202 in which one or more servers receive, via a network, media content to be broadcast or distributed over an electronic network by a media content provider, the media content including audio data. The media content may be, for example, a television, mobile, and/or online advertisement in which an advertiser wishes to know impression and/or exposure by users to the advertisement.

The method then proceeds to step 204, in which the one or more servers determine whether the audio data of the media content includes a uniquely identifying audio identifier. The one or more servers may determine whether the audio data includes a uniquely identifying audio identifier by transforming the audio data using a mathematical algorithm. The mathematical algorithm may be an integral transformation. The integral transformation used to determine whether the audio data includes a uniquely identifying audio identifier may include one or more of a Fourier transform, fast Fourier transform, Fourier sine transform, Fourier cosine transform, Hartley transform, Mellin transform, two-sided Laplace transform, Laplace transform, Weierstrass transform, Hankel transform, Abel transform, Hilbert transform, Poisson kernel, and/or an identity transform.

For example, the one or more servers may transform and/or convert the audio data into a set of frequencies using an integral transform. Once the one or more servers has transformed and/or converted the audio data into a set of frequencies, the one or more servers may evaluate the set of frequencies to determine whether a uniquely identifying audio identifier is included within the set of frequencies based on the presence or lack of a predetermined set of frequencies. For example, in one embodiment, the predetermined set of frequencies may be inaudible to human hearing when reproduced in audio. The one or more servers may compare the set of frequencies transformed from the audio data to the predetermined set of frequencies. If one or more frequencies of the set of frequencies matches one or more predetermined frequencies of the predetermined set of frequencies, then the one or more servers may determine that the audio data of the media content includes a uniquely identifying audio identifier.

When the one or more servers determines that the audio data includes a uniquely identifying audio identifier, at step 206, then the one or more servers may generate new audio data excluding the uniquely identifying audio identifier based on the audio data of the media content. For example, the one or more servers may remove one or more frequencies of the set of frequencies determined to include the uniquely identifying audio identifier, and then may transform and/or convert the remaining set of frequencies into new audio data using the mathematical algorithm, another mathematical algorithm, and/or an inverse of the mathematical algorithm. Further, if the uniquely identifying audio identifier was within a set of frequencies inaudible to human hearing, then the new audio data generated may sound the same as the original audio data to a person.

Then, at step 208, the one or more servers may remove the original audio data from the media content when new audio data is generated. At step 210, the one or more servers may add the new audio data to the media content in place of the original audio data. Finally, at step 212, the one or more servers may broadcast or distribute, via an network, the media content including the new audio data to one or more users. The network may be the same network in which the original media content was received, or the network may be another network. For example, the media content may be initially received over an electronic network, such as the Internet, and then cleansed of traceable identifying audio content and distributed over a television network. Alternatively, the media content may be initially received over an electronic network, such as the Internet, and then cleansed of traceable identifying audio content and distributed back over the Internet to hundreds, thousands, or even millions of users.

Figure 3:
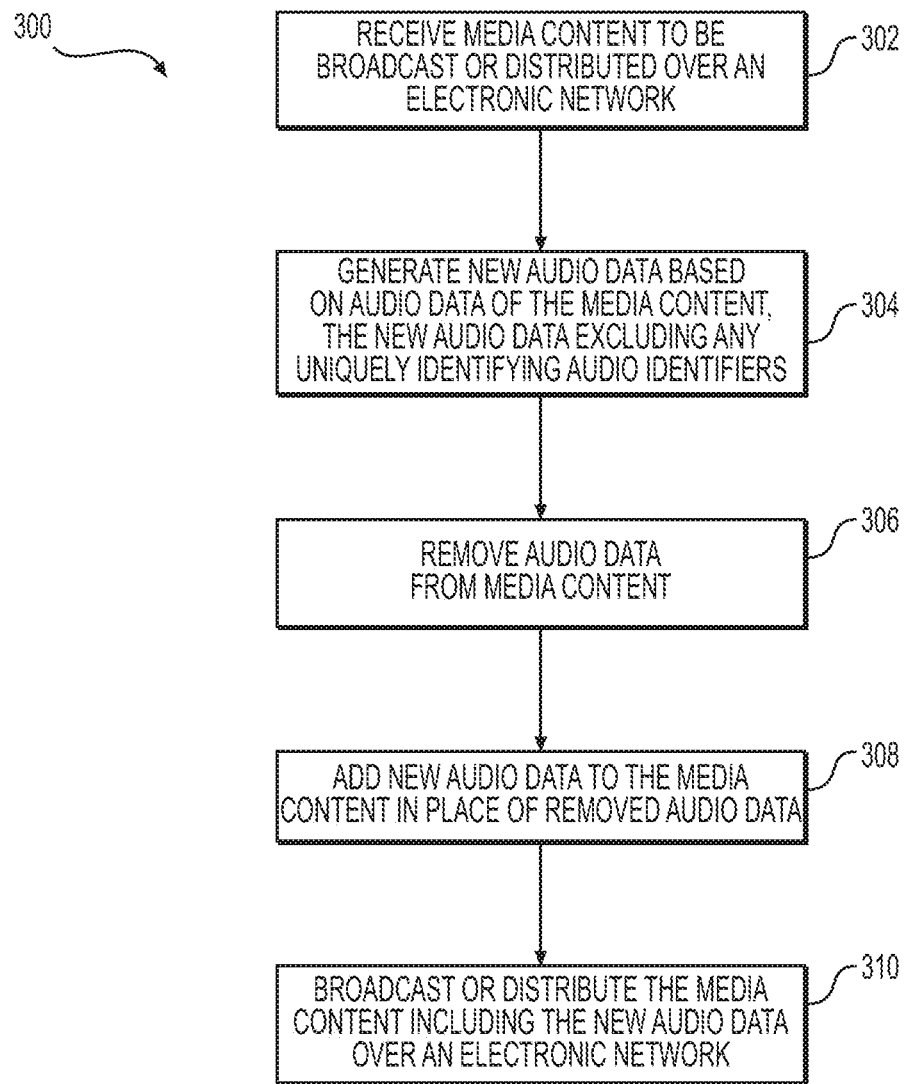
FIG. 3 depicts a block diagram of a method for removing traceable identifying audio content from electronic media content, according to embodiments of the present disclosure.

FIG. 3 depicts a block diagram of a method for removing traceable identifying audio content from electronic media content, according to embodiments of the present disclosure. The method 300 may begin at step 302 in which one or more servers receive, via a network, a media content item to be broadcast or distributed by a media content provider.

The method may then proceed to step 304, in which the one or more servers may generate new audio data based on the audio data of the media content. For example, the one or more servers may remove one or both of high frequency sound and/or low frequency sound from the audio data. Alternatively, or in addition, the one or more servers may vary one or more of the time, speed, and/or frequency of the audio data. Alternatively, or in addition, the one or more servers may include noise in a set of frequencies inaudible to people, the noise being configured to cancel out the frequencies of any uniquely identifying audio identifiers.

Then, at step 306, the one or more servers may remove the original audio data from the media content when new audio data is generated. At step 308, the one or more servers may add the new audio data to the media content in place of the removed, original audio data. Finally, at step 310, the one or more servers may broadcast or distributed, via a network, the media content including the new audio data to a plurality of users. The network may be the same network in which the original media content was received, or the network may be another network.

Figure 4:
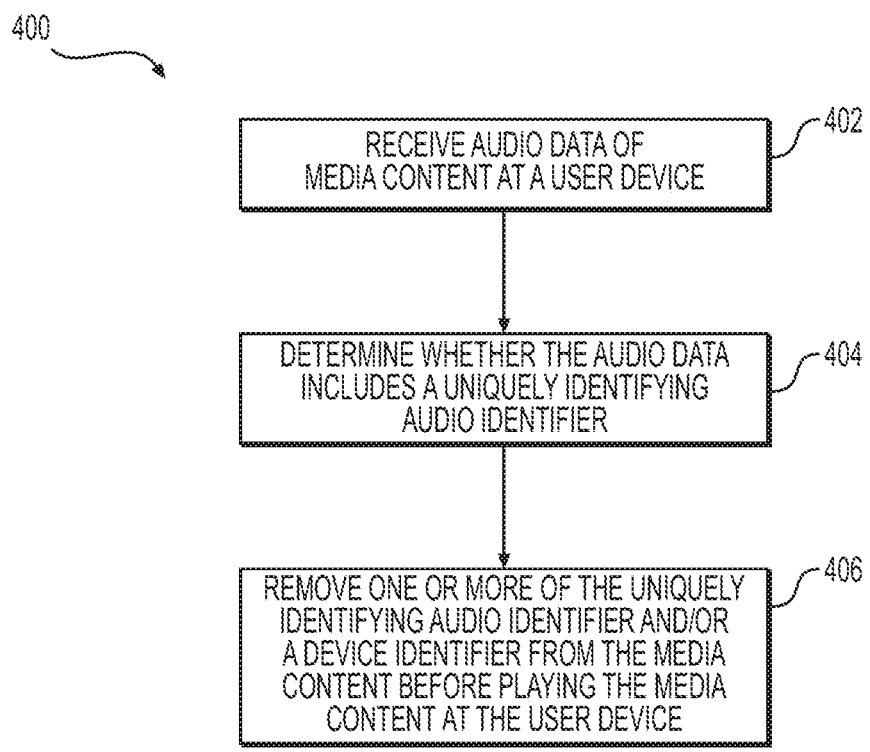
FIG. 4 depicts a block diagram of a method for detecting and removing traceable identifying audio content from electronic media content, according to embodiments of the present disclosure.

FIG. 4 depicts a block diagram of a method for detecting and removing traceable identifying audio content from electronic media content, according to embodiments of the present disclosure. The method 400 may begin at step 402 in which a microphone of a user device receives audio data from a media content item broadcast or distributed by a media content provider.

At step 404, the user device may determine whether the audio data of the media content includes traceable identifying audio content, e.g., a uniquely identifying audio identifier. The user device may determine whether the audio data includes a uniquely identifying audio identifier by transforming the audio data using a mathematical algorithm. The mathematical algorithm may be an integral transformation. The integral transformation used to determine whether the audio data includes a uniquely identifying audio identifier may include one or more of a Fourier transform, fast Fourier transform, Fourier sine transform, Fourier cosine transform, Hartley transform, Mellin transform, two-sided Laplace transform, Laplace transform, Weierstrass transform, Hankel transform, Abel transform, Hilbert transform, Poisson kernel, and/or an identity transform.

For example, the one or more servers may transform and/or convert the audio data into a set of frequencies using an integral transform. Once the user device has transformed and/or converted the audio data into a set of frequencies, the user device may evaluate the set of frequencies to determine whether a uniquely identifying audio identifier is included within the set of frequencies based on the presence or lack of a predetermined set of frequencies. For example, in one embodiment, the predetermined set of frequencies may be inaudible to human hearing when reproduced in audio. The user device may compare the set of frequencies transformed from the audio data to the predetermined set of frequencies. If one or more frequencies of the set of frequencies matches one or more predetermined frequencies of the predetermined set of frequencies, then the user device may determine that the audio data of the media content includes a uniquely identifying audio identifier.

When the user device determines that the audio data includes a uniquely identifying audio identifier, at step 406, the user device may remove one or more of the uniquely identifying audio identifiers and/or a user device identifier that identifies the user device from the media content before playing the media content at the user device. Alternatively, and/or in addition, the user device may remove one or more of the uniquely identifying audio identifiers and/or a user device identifier that identifies the user device from any transmissions from the user device via an electronic network.

Figure 5:
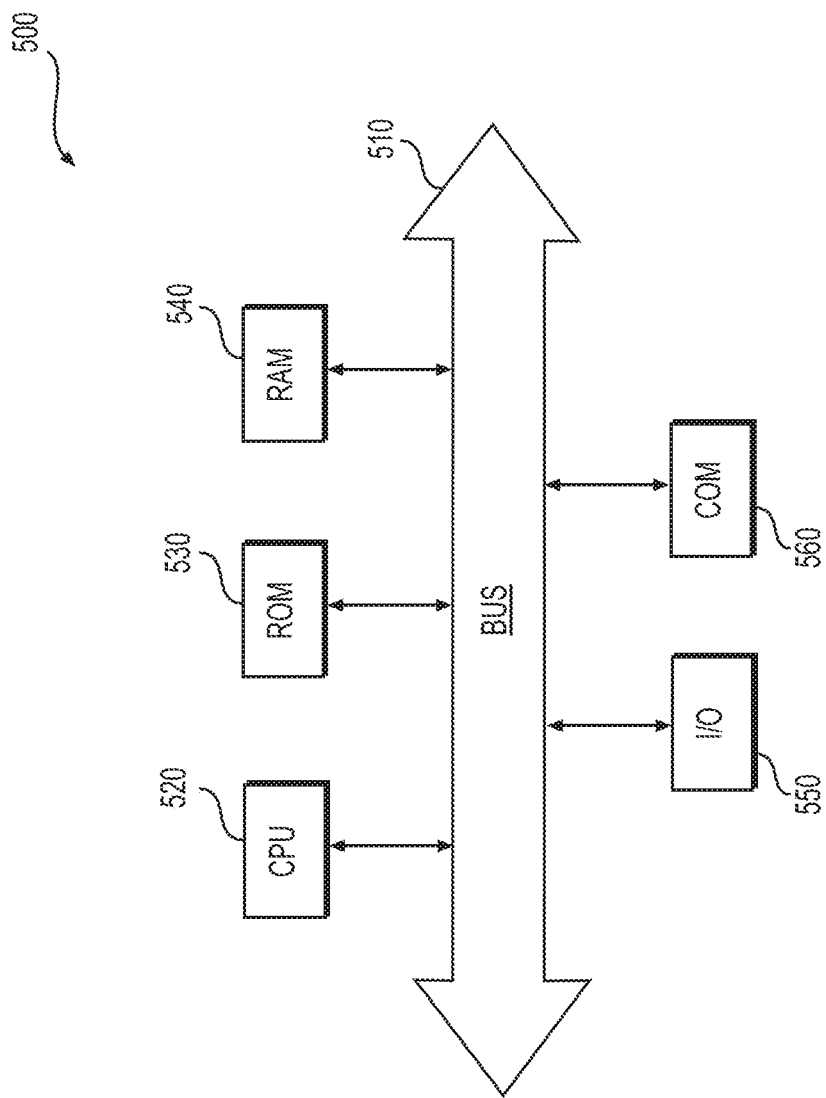
FIG. 5 is a simplified functional block diagram of a computer configured as a device for executing the methods of FIGS. 2, 3, and 4, according to exemplary embodiments of the present disclosure.

FIG. 5 is a simplified functional block diagram of a computer that may be configured as the user devices, servers, and/or exchanges for executing the methods, according to exemplary an embodiment of the present disclosure. Specifically, in one embodiment, any of the user devices, servers, and/or exchanges may be an assembly of hardware 500 including, for example, a data communication interface 560 for packet data communication. The platform may also include a central processing unit ("CPU") 520, in the form of one or more processors, for executing program instructions. The platform typically includes an internal communication bus 510, program storage, and data storage for various data files to be processed and/or communicated by the platform such as ROM 530 and RAM 540, although the system 500 often receives programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

As will be recognized, the present disclosure is not limited to these particular embodiments. For instance, although described in the context of detecting and removing traceable identifying audio content from electronic media content, the present disclosure may also be used in other types of media that include audio data.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A computer-implemented method for detecting and removing traceable identifying audio content from electronic media content, the method comprising:
    receiving, over a network at one or more servers, media content to be broadcast or distributed, the media content including first audio data;
    detecting, by the one or more servers, traceable identifying audio content in the first audio data, the traceable identifying audio content defined by an audio identifier;
    generating, by the one or more servers, second audio data based on the first audio data of the media content;
    removing, by the one or more servers, the first audio data from the media content;
    adding, by the one or more servers, the second audio data to the media content; and
    broadcasting or distributing, by the one or more servers, the media content having the second audio data to one or more user devices.

2. The method of claim 1, wherein detecting the traceable identifying audio content includes evaluating the first audio data based on a predetermined set of frequencies, the predetermined set of frequencies including at least one of inaudible human frequencies, ultrasonic audio frequencies, and infrasonic audio frequencies.

3. The method of claim 1, wherein detecting the traceable identifying audio content includes transforming the first audio data into a set of frequency components using an integral transformation, the integral transformation being at least one of a Fourier transform, fast Fourier transform, Fourier sine transform, Fourier cosine transform, Hartley transform, Mellin transform, two-sided Laplace transform, Laplace transform, Weierstrass transform, Hankel transform, Abel transform, Hilbert transform, Poisson kernel, and an identity transform.

4. The method of claim 1, wherein generating the second audio data based on the first audio data of the media content comprises:
    removing, by the one or more servers, a set of frequencies determined to include the audio identifier from a transformed first audio data; and
    transforming, by the one or more servers, a remaining set of frequencies of the transformed audio data into second audio data using an integral transform.

5. The method of claim 1, wherein the audio identifier is in a human inaudible frequency range.

6. The method of claim 1, wherein the audio identifier is in at least one of an ultrasonic audio frequency range and an infrasonic frequency range.

7. A system for detecting and removing traceable identifying audio content from electronic media content, the system including:
- a data storage device that stores instructions for detecting and removing traceable identifying audio content from electronic media content; and
- a processor configured to execute the instructions to perform a method including:
  - receiving, over a network at one or more servers, media content to be broadcast or distributed, the media content including first audio data;
  - detecting, by the one or more servers, traceable identifying audio content in the first audio data, the traceable identifying audio content defined by an audio identifier;
  - generating, by the one or more servers, second audio data based on the first audio data of the media content;
  - removing, by the one or more servers, the first audio data from the media content;
  - adding, by the one or more servers, the second audio data to the media content; and
  - broadcasting or distributing, by the one or more servers, the media content having the second audio data to one or more user devices.

8. The system of claim 7, wherein detecting the traceable identifying audio content includes evaluating the first audio data based on a predetermined set of frequencies, the predetermined set of frequencies including at least one of inaudible human frequencies, ultrasonic audio frequencies, and infrasonic audio frequencies.

9. The system of claim 7, wherein detecting the traceable identifying audio content includes transforming the first audio data into a set of frequency components using an integral transformation, the integral transformation being at least one of a Fourier transform, fast Fourier transform, Fourier sine transform, Fourier cosine transform, Hartley transform, Mellin transform, two-sided Laplace transform, Laplace transform, Weierstrass transform, Hankel transform, Abel transform, Hilbert transform, Poisson kernel, and an identity transform.

10. The system of claim 7, wherein generating the second audio data based on the first audio data of the media content comprises:
- removing, by the one or more servers, a set of frequencies determined to include the audio identifier from a transformed first audio data; and
- transforming, by the one or more servers, a remaining set of frequencies of the transformed audio data into second audio data using an integral transform.

11. The system of claim 7, wherein the audio identifier is in a human inaudible frequency range.

12. The system of claim 7, wherein the audio identifier is in at least one of an ultrasonic audio frequency range and an infrasonic frequency range.

13. A non-transitory computer-readable medium storing instructions that, when executed by a computer, cause the computer to perform a method for detecting and removing traceable identifying audio content from electronic media content, the method including:
- receiving, over a network at one or more servers, media content to be broadcast or distributed, the media content including first audio data;
- detecting, by the one or more servers, traceable identifying audio content in the first audio data, the traceable identifying audio content defined by an audio identifier;
- generating, by the one or more servers, second audio data based on the first audio data of the media content;
- removing, by the one or more servers, the first audio data from the media content;
- adding, by the one or more servers, the second audio data to the media content; and
- broadcasting or distributing, by the one or more servers, the media content having the second audio data to one or more user devices.

14. The computer-readable medium of claim 13, wherein detecting the traceable identifying audio content includes evaluating the first audio data based on a predetermined set of frequencies, the predetermined set of frequencies including at least one of inaudible human frequencies, ultrasonic audio frequencies, and infrasonic audio frequencies.

15. The computer-readable medium of claim 13, wherein detecting the traceable identifying audio content includes transforming the first audio data into a set of frequency components using an integral transformation, the integral transformation being at least one of a Fourier transform, fast Fourier transform, Fourier sine transform, Fourier cosine transform, Hartley transform, Mellin transform, two-sided Laplace transform, Laplace transform, Weierstrass transform, Hankel transform, Abel transform, Hilbert transform, Poisson kernel, and an identity transform.

16. The computer-readable medium of claim 13, wherein generating the second audio data based on the first audio data of the media content comprises:
- removing, by the one or more servers, a set of frequencies determined to include the audio identifier from a transformed first audio data; and
- transforming, by the one or more servers, a remaining set of frequencies of the transformed audio data into second audio data using an integral transform.

17. The computer-readable medium of claim 13, wherein the audio identifier is in a human inaudible frequency range.

18. The computer-readable medium of claim 13, wherein the audio identifier is in at least one of an ultrasonic audio frequency range and an infrasonic frequency range.

* * * * *